W. D. FREDRICK.
GLASS BLOWING MACHINE.
APPLICATION FILED JUNE 6, 1905.

975,758.

Patented Nov. 15, 1910.
6 SHEETS—SHEET 1.

Fig. 1.

WITNESSES:
INVENTOR:
W. D. Fredrick
by his Attorneys

W. D. FREDRICK.
GLASS BLOWING MACHINE.
APPLICATION FILED JUNE 6, 1905.

975,758.

Patented Nov. 15, 1910.
6 SHEETS—SHEET 2.

WITNESSES:

INVENTOR:
William Dayton Fredrick
by his Attorney.
Howson & Howson

W. D. FREDRICK.
GLASS BLOWING MACHINE.
APPLICATION FILED JUNE 6, 1905.

975,758.

Patented Nov. 15, 1910.
6 SHEETS—SHEET 3.

WITNESSES:
T. W. Buckhead.
A. E. Powell.

INVENTOR:
William Dayton Fredrick
by his Attorneys,
Howson & Howson

UNITED STATES PATENT OFFICE.

WILLIAM DAYTON FREDRICK, OF BRIDGETON, NEW JERSEY, ASSIGNOR TO MILLVILLE MACHINE COMPANY, OF MILLVILLE, NEW JERSEY, A CORPORATION OF NEW JERSEY.

GLASS BLOWING MACHINE.

975,758.

Specification of Letters Patent.   Patented Nov. 15, 1910.

Application filed June 6, 1905.   Serial No. 263,978.

*To all whom it may concern:*

Be it known that I, WILLIAM DAYTON FREDRICK, a citizen of the United States, and a resident of Bridgeton, New Jersey, have invented certain Improvements in Glass-Blowing Machines, of which the following is a specification.

My invention relates to machines for blowing hollow glass-ware, and consists of certain improvements in that class of apparatus designed to effect automatically, by the aid of fluid under pressure, air for instance, the operation of the various parts of the machine from the primary recessing and pressing of the charge of glass, to the subsequent blowing of the same to form the article under process of manufacture.

My improved apparatus embodies means for effecting the intermittent rotation of a table or carrier supporting the blow-molds; means for automatically arresting the movement of such table or carrier gradually, means for effecting the automatic rotation of a blank or press-mold carrier; the movement of such carriers bearing a definite relation to each other so that when they stop one set of the molds supported thereby are in registry and the blank or press-mold carrier is at a point convenient to receive a charge of glass; means for effecting the automatic presentation of such blank or press-molds at regular intervals to receive a charge of glass which is subsequently recessed by one of a series of plungers employed for the purpose, such action forming the neck and shoulder of the article of hollow-ware; means for withdrawing the blank or press-mold; means for effecting the automatic insertion of the blow-mold bottom to form the bottom of the finished article after the blank or press-mold has been withdrawn; means for effecting the partial movement of the table carrying the blow-molds to a position for blowing the charge of glass within one of said molds; means for positioning a blow-head over said mold; means for effecting the automatic operation of valves controlling a supply of motive fluid under pressure to cause the movement of said blow-head, and the subsequent passage from another source of supply of fluid under pressure to such molds to complete the article of hollow-ware under process of manufacture; means for effecting the withdrawal of the blow-head when the pressure controlling the position of the same is cut off; means for effecting the further movement of the table carrying the blow-molds for the purpose of removing the finished article, and means for automatically withdrawing the blow-mold bottoms to permit the insertion of a fresh blank or press-mold to receive a charge of glass.

Other features of my invention and the details of construction will be fully pointed out hereinafter, reference being had to the accompanying drawings, in which:

Fig. 2, is a sectional plan view, taken on the line $a$—$a$, Fig. 1, showing the rotatable blow-mold carrier.

The improved machine forming the subject of my invention, together with all of its operative mechanism is mounted upon a carriage or movable structure 1 having a fixed platform or table 2, supporting a frame 3, to which a plunger-carrying frame 4 is connected; a cylinder 5 and piston 6 for operating said plunger mechanism; a blow-pipe 7, and a blow-head 8 and their operating mechanism. The table or platform 2 has a central stem 10 providing a journal for the rotatable blow-mold carrier 11. In addition, the table or platform 2 carries means for effecting the rotation of the blow-mold carrier, means for stopping and locking the same after each quarter revolution; a rotating carrier 12 supporting a series of blank or press molds 13; a cylinder 14 having a piston 15 which is employed to move said press-molds into and out of a series of blow-molds 16 mounted on the carrier 11, and cams 17 and 18 for automatically moving the bottoms 19 of the blow-molds into and out of their operative position during the rotation of the blow-mold carrier or table.

The blow-molds 16 are of the split variety, hinged at the rear, and the bottom of each section is constructed to interlock with parts 16ª of the carrier 11, which parts are recessed for the sliding bottoms 19 and apertured for the passage of the press molds 13.

The blank or press-molds 13 are disposed below the blow-mold carrier 11, and the rotating carrier 12 supporting said press-molds has a gear wheel 20 meshing with another gear wheel 21 of the same diameter, which is keyed to and rotates with the hub 22 of the carrier 11 supporting the blow-molds 16, so that for every quarter-turn of this latter carrier, a fresh blank or press-mold will be in position to be raised into a fresh blow-mold to receive a charge of glass; each of said blow-mold structures being provided with the movable bottom 19 which is automatically withdrawn to permit the insertion of the blank or press-mold as said blow-mold is moved to the charging position. At the lower end of the central stem 10 of the main table or platform, a ball-bearing 23 is provided so that friction due to the movement of the blow-mold carrier will be as little as possible.

Figure 1:
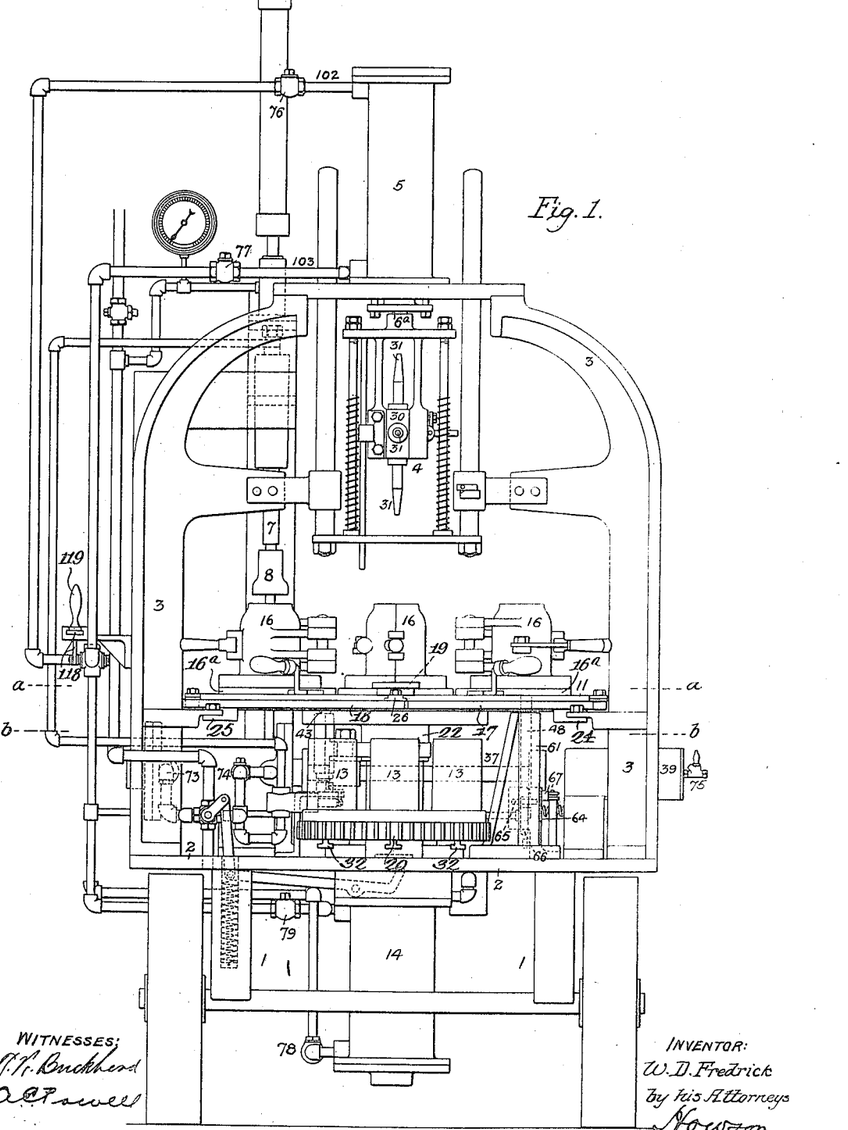
Figure 1, is a front elevation of the improved glass-blowing machine forming the subject of my invention.
Figures 2, 8, 10, 11:
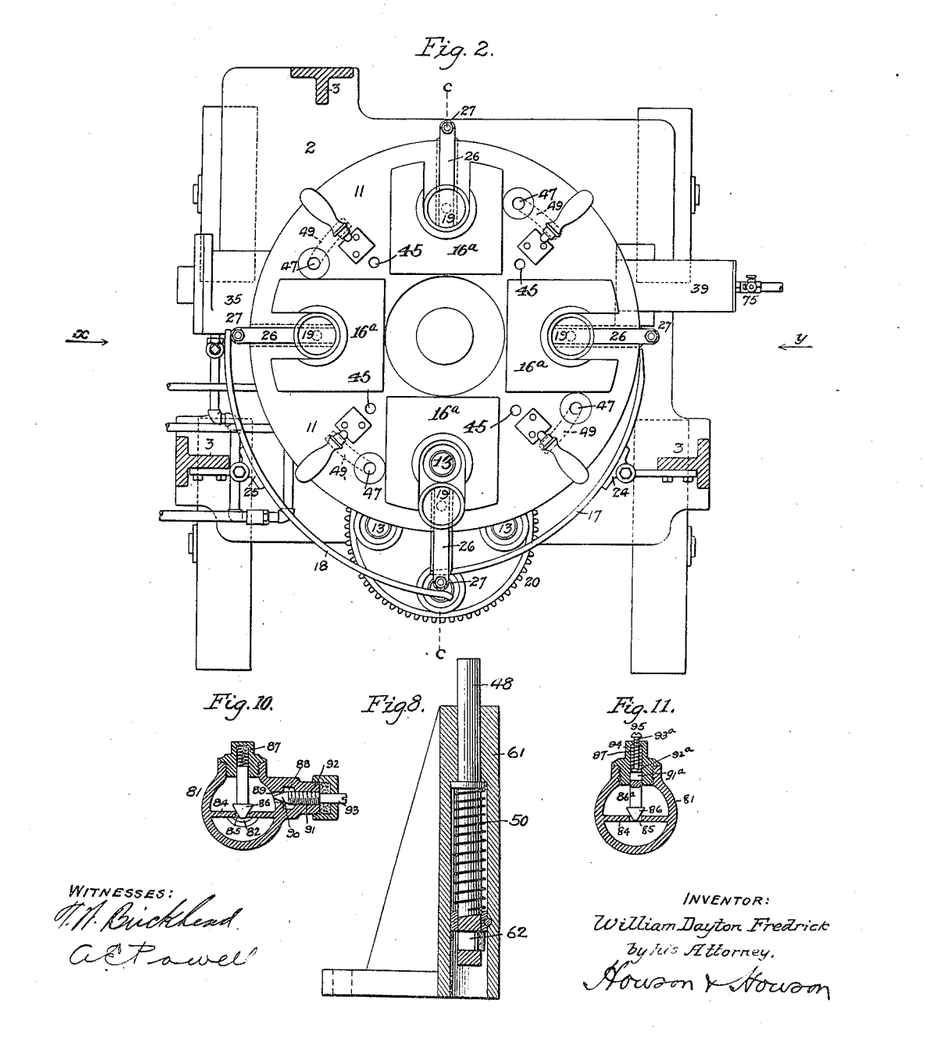

To withdraw the blow-mold bottoms 19, the cam 17 is provided, clearly shown in Fig. 2, which cam is carried by a bracket 24 secured to the frame 3 of the machine in proper position with relation to the carrier 11, and to push these bottoms back into their proper position with relation to the blow-molds, a similar cam 18, carried by a bracket 25, also secured to the frame 3 of the machine and disposed at another point with respect to said carrier 11, is provided. These bottoms 19 have projecting arms 26 provided with anti-friction rollers 27 to engage the cams.

Beneath the table 2, the cylinder 14 is mounted, having a rod 28 and piston 15, which rod, when pressure is applied to the under side of its piston, serves to push one of the blank or press-molds 13 into one of the blow-mold structures 15 disposed above and in registry therewith, and when said blank or press-mold is in the raised position it is ready to receive a charge of glass. As soon as this charge of glass has been placed therein, a head 30 carrying a series of recessing plungers 31 is depressed and one of said plungers is forced into the glass within the blank or press-mold, forming a preliminary opening therein and also forming the mouth and the outer contour of the neck and shoulder of the bottle or other article of hollow-ware. As soon as this is accomplished, the plunger 31 is raised out of the glass by means of the piston 6 in the cylinder 5, and the piston 15 in the cylinder 14 is depressed carrying with it the rod 28 which withdraws the blank or press-mold. These blank or press-molds are provided with depending headed stems 32, and the upper end of the rod 28 has a slotted head 33 with inwardly projecting jaws 34 to engage the heads of the stems 32. The blank or press-molds being supported by a rotating carrier, the jaws of the head 33 are so arranged that the headed stems 32 of said molds moving in the arc of the circle of rotation can enter and leave without obstruction, but when disposed centrally over said plunger they are engaged by the jaws 34 of its head and may be moved up or down.

Figure 3:
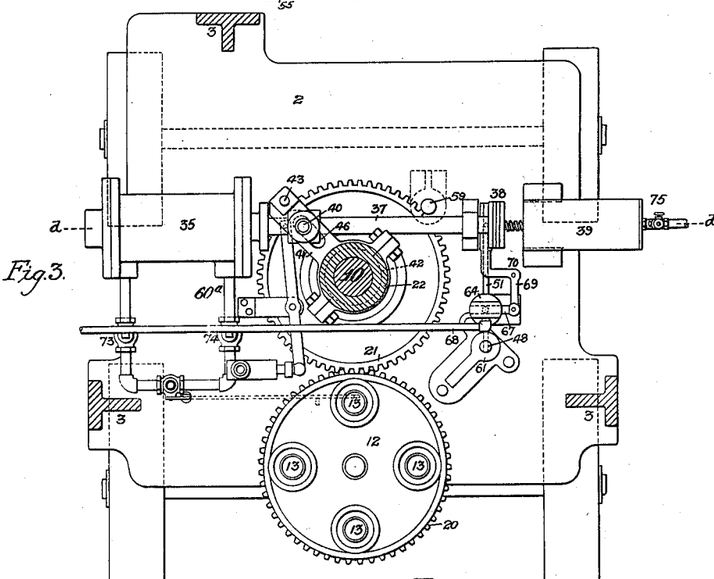
Fig. 3, is a sectional plan view, taken on the line $b$—$b$, Fig. 1, showing the blank or press-mold carrier, the means for operating the same and the fixed platform or table below the rotatable blow-mold carrier.
Figure 4:
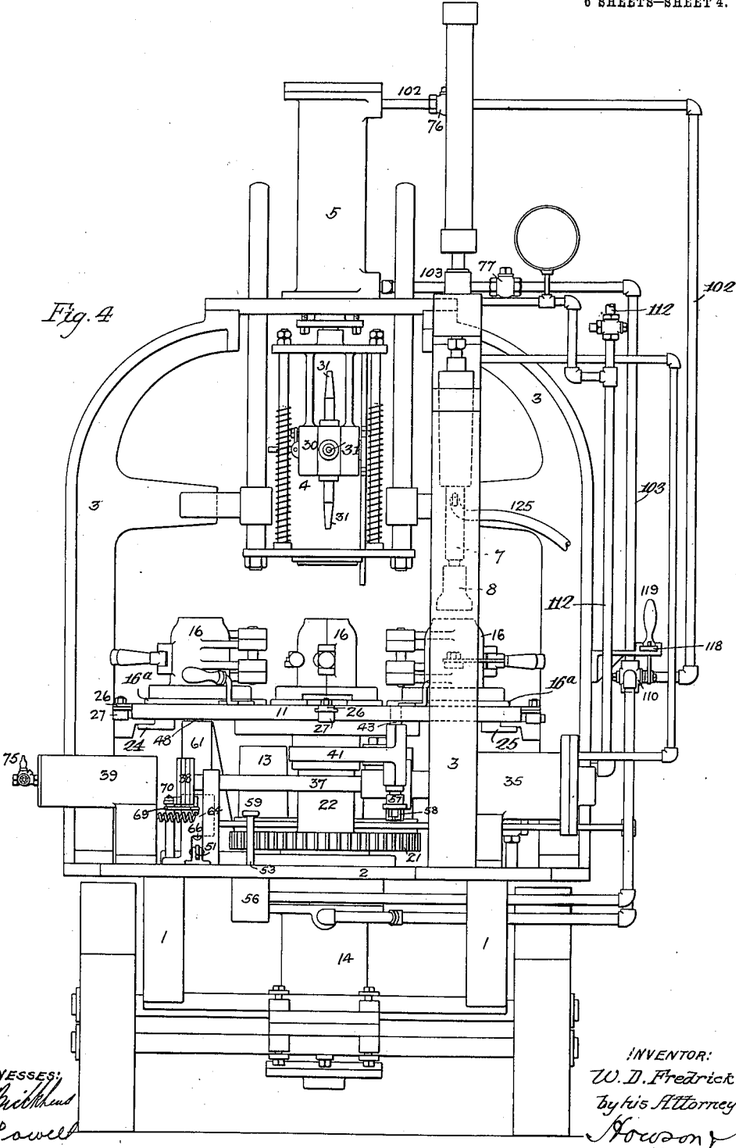
Fig. 4, is a rear elevation of the machine.

As soon as the blank or press-mold has been withdrawn after the formation of the glass-blank, the carrier 11 is ready to be moved a quarter turn, during which time the blow-mold bottom is pushed into place by the cam 18, and this movement of the table is effected by the following mechanism:

At the rear of the machine and carried by the fixed table or platform 2, is a cylinder 35 in which a piston 36 carried by a rod 37 reciprocates, the opposite end of which rod is provided with a smaller piston 38 arranged to enter an open ended cup or cylinder 39 forming substantially what is known as a dash pot, and which, when said piston is entering, serves to retard the movement of the blow-mold carrier as it nears the end of its quarter turn. The rod 37 carries a pivot connection 40 for the end of a crank arm 41, which is journaled in a groove 42 formed in the hub 22 of the rotating blow-mold carrier 11, and this arm, in combination with a pin 43 supported by a spring 44, is employed to move said carrier. In Fig. 3, the crank arm is shown in position to engage the table (not shown) and move the same a quarter turn, while in Fig. 7, the pin is shown in engagement with the table at the end of the quarter turn. The table is provided with a series of openings 45 with which the pin 43 carried by this arm is adapted to engage so that when the arm is moved in the arc of a circle through its connection with the rod 37, the table will be moved with it, the arm being slotted at 46 for proper engagement with said pivot connection.

The pin 43 is maintained in the raised position to engage the table by means of the spring 44, and after said table has been moved a quarter turn, the extent of movement of the crank arm 41, it is to be locked or held against further movement during the various steps incident to the formation of the hollow glass-ware under process of manufacture. For this purpose the underside of the carrier 11 is provided with another series of holes 47, and a pin 48 is arranged to be projected into one of said holes, of which there are four, when the carrier reaches the end of its quarter turn. Leading to each of these holes, is an inclined surface 49 on the under side of the table so that said pin 48 may start to engage the carrier before the latter comes to the limit of its movement. This pin is maintained in engagement with the table by means of a spring 50. When it is desired to start the table again, the pin 48 is depressed and withdrawn from the table by means of a lever 51 operated in a manner to be described hereinafter.

Before the table can be given the further movement, however, it is necessary to disengage the driving means and retract the same for a fresh engagement. The pin 43 carried by the crank arm 41 is withdrawn by means of a rod 53 connected to a piston 54, supported by a spring 55 and disposed in a cylinder 56 mounted beneath the fixed table or platform 2. The lower end of the pin 43 is provided with a head 57 having jaws 58 to engage the head 59 of the rod 53, and pressure being admitted to act upon the piston 54, the latter will be withdrawn and with it the pin 43 thereby releasing the crank arm from its connection with the table. Immediately following this action, pressure will be admitted to the cylinder 35 through a pipe 60ª, and this pressure moving the piston 36 and with it the rod 37, the crank arm 41 will be retracted and when in the fully retracted position, its pin 43 will be directly beneath one of the openings 45 in the table. Under the influence of the spring 44 supporting said pin, it will be raised into said opening. The table operating mechanism is now ready to move the table another quarter turn, and this action may take place as soon as the pin 48 is released. As the arm 41 is retracted, the jaws 58 of the pin 43 are carried out of engagement with the plunger for lowering the same, and said pin, under the influence of its spring 44, will then contact with the under surface of the table until brought to a position beneath another opening 45.

Figure 7:
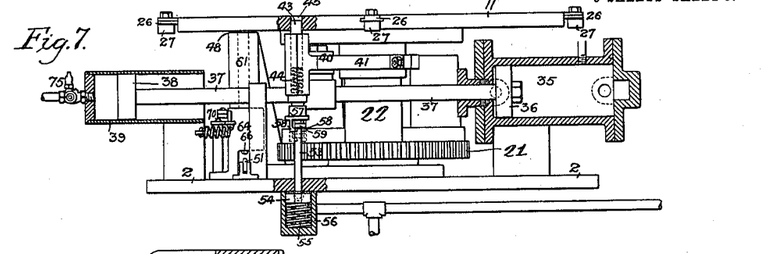
Fig. 7, is a sectional elevation of the cylinder for rotating the mold carrying table, taken on the line $d$—$d$, Fig. 3, looking from the rear of the machine, and Figs. 8 to 13, inclusive, are views illustrating details of my invention.
Figure 9:
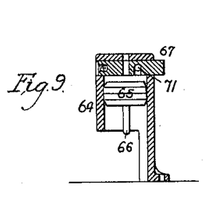

The stopping or locking pin for the blow-mold carrier 11 is operated in the following manner, reference being had to Figs. 7, 8 and 9 of the drawings: This pin 48 is mounted in a casing 61 and held in the elevated position by means of the spring 50, which is under tension at all times. The lower end of this pin is slotted at 62, and the end of the lever 51, pivoted at 63, is arranged to engage this slotted end of the pin. The lever passes through a small cylinder 64 containing a piston 65 with a stem 66, disposed directly over said lever, and this piston and stem serve to lower said pin by depressing the lever 51. At the top of the cylinder a sliding valve 67 is mounted which controls the pressure to act upon said piston, and the pin will be depressed when pressure is admitted to the cylinder through pipe 68. The valve is connected to a bell crank lever 69 pivoted at 70, and the free end of this lever is disposed in the path of the piston 38. When said piston is retracted free of the cylinder 39 by the rod 37, it engages the free end of the lever 69 and in moving this end in one direction, the opposite end connected to the valve 67 is moved in the opposite direction bringing the port 71 of the valve in line with the pressure inlet 72 and pressure passing thereby to the piston 65, the latter is lowered and with it the lever 51 which draws the pin 48 out of one of the openings 47 of the table, and the latter is then free to be moved by the crank arm 41.

It is desirable that the carrier 11 be brought to a stop with as little jar as possible in order that the articles of hollow-ware in process of manufacture and disposed within the blow-molds, shall not be displaced and caused to engage one side or the other of the molds, a condition which would cause a faulty finished article. To overcome this, means are provided to prevent the sudden stoppage of the table as it is engaged by the locking pin 48 provided to hold the table rigid during the various operations in connection with the blowing of the articles of hollow-ware. For the purpose of stopping the table in the manner desired, the cylinder 35 is provided with check-valves 73 and 74, and the cylinder 39 is provided with a check valve 75, each of said valves having means to permit bleeding of the pressure so that they gradually exhaust at one end or the other as the pressure is entering the opposite end. This device thus operates as a brake to check the movement of the table as it approaches its position of rest, and by this means, a movement is provided for the table that is fast enough but one in which the stoppage is so gradual that no harm may come to the article being blown. In addition to these valves, the cylinder 5 is provided with check-valves 76 and 77 connected to its pressure delivering pipes, and the cylinder 14, is also provided with check-valves 78 and 79 connected to its pressure delivering pipes.

The check valves are placed at points to intercept back pressure or exhaust during a certain part of the operation of the machine, and as the movement occasioning this pressure is applied for arresting the intermittent movements of the mold carrying table, (as well as other movements of the machine) it is desired to effect the stoppages of the same gradually and at a predetermined point so that no shock will be given said table; thereby avoiding all danger of displacing or damaging the blanks disposed within the molds.

Figure 12:
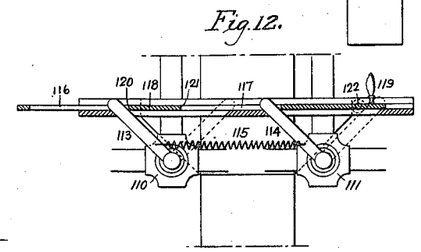

The check-valve is the same in each instance, and in Figs. 11 and 12 of the drawings, 81 represents the shell or casing, having the usual inlet and outlet openings 82 and 83. Within the casing a partition or wall 84 is arranged, having an opening 85 which is closed by a check-valve 86 held to its seat by a spring 87. This valve operates after the manner of all check-valves; under normal conditions preventing any back pressure of fluid passing the same. It may be desirable under certain conditions, however, to apply such valve to the ends of a cylinder for the purpose of holding the pressure of the exhaust, and providing said valve with means to permit it to leak or bleed past the valve, thereby causing such exhaust to act as a cushion to retard the movement of a piston or plunger within such cylinder. For this purpose, in one embodiment of my invention, the valve casing is provided with a passage 88 leading around the valve 86 and forming a by-pass. The port 89 of this by-pass is controlled or regulated by a tapered plug 90, carried by a threaded stem 91 adapted to a threaded opening 92 in the wall of the passage forming the by-pass, and having a notched end 93 whereby it may be adjusted by an ordinary screw-driver. By this means, provision is made for the gradual leaking or bleeding of the exhaust pressure around the check-valve, but not interfering with the function of or permitting any back pressure to directly pass the same. A gradual discharge or exhaust of the fluid, depending upon the available area of the port 89, takes place through the by-pass, thereby permitting, with the desired cushioning effect, the return movement of the piston or plunger. If at any time it is desired to employ the structure as a simple check-valve, the tapered plug valve 90 may be screwed down into its seat.

Instead of having a casing with a special passage forming a by-pass, I may provide other means for raising the valve from its seat and permitting the exhaust pressure to leak or bleed directly past the same, as shown in Fig. 12. In this instance, the valve stem 86$^a$ is provided with an opening 91$^a$ to receive a projection or boss 92$^a$ carried on the end of a screw 93$^a$ and loosely fitting said valve stem, the screw being adapted to a threaded opening in the cap 94 and provided with the usual slotted head 95, whereby it may be adjusted and through it the valve 86; the latter being raised from or lowered onto its seat. The valve is kept normally depressed by the spring and the opening 91$^a$ is large enough to permit the valve to rise sufficiently under the force of pressure from beneath the same. This valve forms the subject matter of a special application filed of even date herewith.

In blowing bottles or other articles of hollow-ware, the first thing to be accomplished is to effect the pressing of the neck portion of the same and to form the mouth and a primary opening in the mass of glass which has been charged into the blank or press mold. For this purpose, a series of plungers 31 are employed, carried by a rotatable head or hub 30 which is so arranged and connected as to be rotated after each depression, thereby bringing a fresh, cool plunger into position to enter the mass of glass charged into each successive blank or press-mold as they are brought into position beneath said plunger head. The head or hub carrying these plungers is secured to a rotating spindle or shaft journaled in suitable bearings in a vertically movable frame 4 and is of the same type and operates in the same manner as that illustrated in Patent No. 792,500, dated June 13, 1905. This frame is connected to a rod 6$^a$ having a piston 6 mounted in the cylinder 5 above the frame 3 of the machine, to which cylinder pressure is admitted through the pipe 102 to lower the piston and the head or hub carrying such plungers, and through the pipe 103 to raise the piston and with it the head and plungers.

After the glass has been poured into a blank or press-mold disposed beneath the plunger head 30, the latter is caused to descend in the usual manner, forcing one of the plungers 31 into the glass within said mold, effecting the primary opening or recess in the glass and causing it to enter the top of the mold thereby forming the mouth, neck and shoulder of the bottle or other article under process of manufacture. The pipe 102 is provided with a check-valve 76, and the pipe 103 is provided with a check-valve 77, both valves being constructed and arranged in the manner just described, to admit full pressure and exhaust the same gradually so as to provide a safe working speed for the piston.

Figure 5:
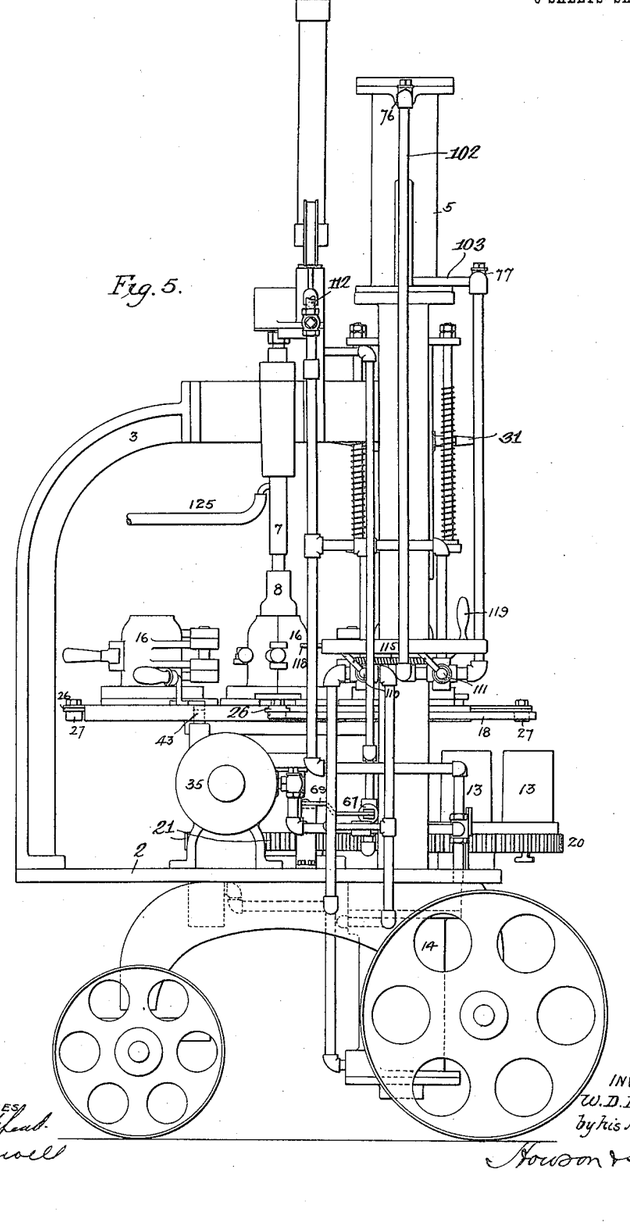
Fig. 5, is a side elevation looking in the direction of the arrow $x$, Fig. 2.
Figure 6:
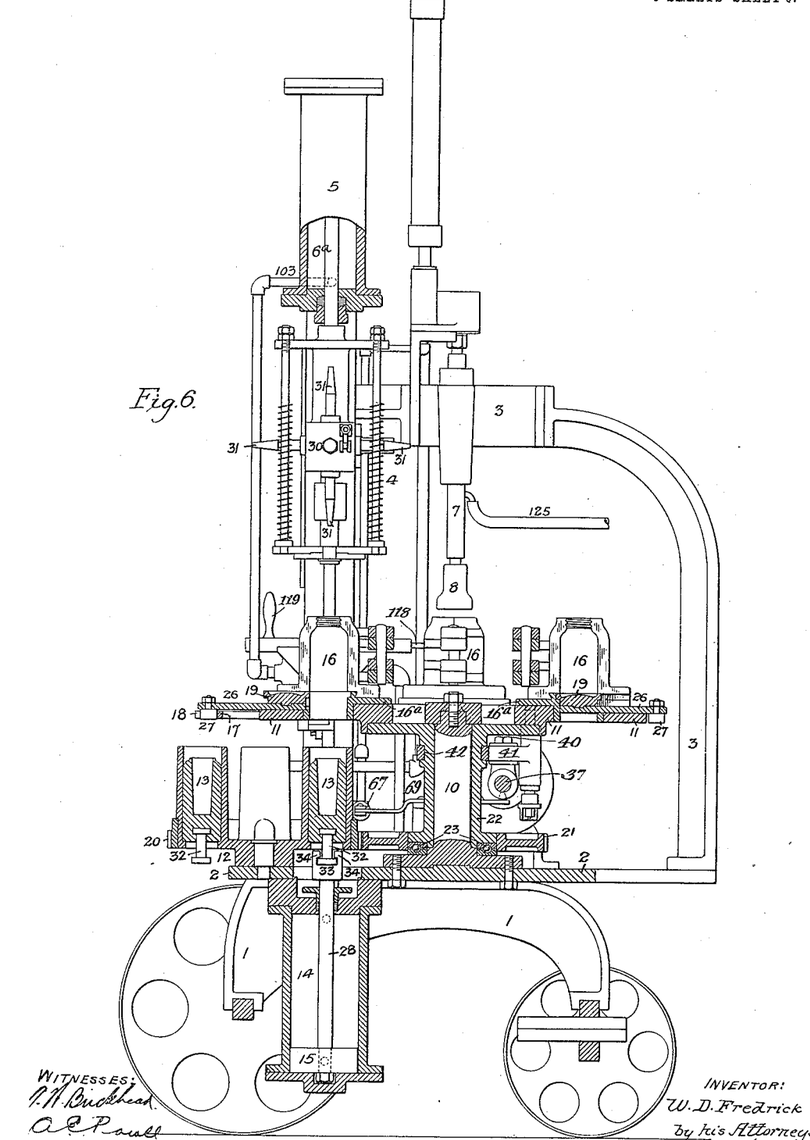
Fig. 6, is a sectional elevation of the machine, taken on the line $c$—$c$, Fig. 2, looking in the direction of the arrow $y$, Fig. 2.
Figure 13:
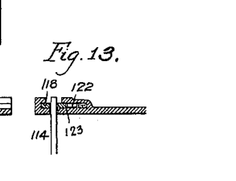

Air under pressure is employed for carrying out the various movements of the different parts of the apparatus forming the subject of my invention and such pressure is controlled by two four-way valves 110 and 111 which are connected to the several pipes for delivering the motive fluid to the various cylinders, and are operated alternately; thereby causing the several movements of the different parts of the machine to take place in proper succession. The construction and arrangement of these valves is shown in Figs. 5, 13 and 14. The pressure to operate the machine is admitted (independently of the pressure to shape the glass within the blow-molds,) to the pipe 112, and from this pipe it passes to the other pipes delivering it to the various cylinders.

The valves 110 and 111 have stems 113 and 114, which are connected by a spring 115, whose constant tendency is to move the valves toward each other. These stems pass through slots 116 and 117 respectively in a plate 118 designed to operate said valves independently, such plate being provided with an operating handle 119. When the plate is in the position to the extreme left, the upper and right-hand and lower and left-hand passages of the valves are in registry and are maintained in such position by the plate. The plate is slotted for the passage of the stems of the valves and also to provide portions to engage said stems to operate the valves. When the plate is moved to the right half way over, the end wall 120 of the slot 116, which has been in engagement with said stem 113 of the valve 110 to hold it in that position, will be released, and the spring 115 will reverse the position of the stem thereby placing the upper and left-hand and the lower and right-hand passages of the valve 110 in registry, but not disturbing the valve 111, such spring serving to keep the valve stems turned toward each other. Upon moving the plate the full distance, the end wall 121 of the slot 117 will engage the stem 114 of the valve 111, reversing the position of the same and throwing it to the same position as the stem 113 and said valve 111 will have its passages in the same position as the valve 110. Both valves are held in the extreme positions by the plate which is retained by a spring controlled pin 122 engaging notches 123 in the side of the plate. Upon the return movement of the plate, the stem 114 will be moved by the spring and the valve 111 reversed; the continued movement of the plate shifting the valve stem 113 and reversing the valve 110. The plate serves to hold the valves fully turned in one position or the other while the spring serves to hold one valve in one position and the other valve in the opposite position.

One valve controls pressure to operate the table or carrier and the retarding, locking and releasing means, while the other valve controls the movement of the blank or press-molds to receive the charge of glass and the movement of the plungers to recess the same.

In my improved glass blowing machine, a blow-head 8 is provided, which is carried by a blow-pipe 7 vertically mounted; said blow-head being arranged to engage one of the blow-molds when the latter is positioned beneath the same, and the glass within said mold is ready to be blown. A pipe or tube 125 supplying pressure is connected to said blow-pipe, and special means are provided for dropping this blow-head into place. This mechanism, however, and the particular form of blow-head, forms the subject-matter of a companion application to which reference is made and for which no description is needed herewith.

Having thus described my invention, I claim and desire to secure by Letters Patent:

1. In a glass blowing machine, the combination of a rotatable carrier, a series of blow-molds mounted thereon, a second rotating carrier, a series of blank or press-molds mounted therein, means for rotating said second carrier from the first carrier whereby the blank-molds will be brought into registry beneath the blow-molds, sliding bottoms for said blow-molds, means brought into action automatically by the movement of the carrier for withdrawing the same, a cylinder, and a fluid operated piston in said cylinder arranged to move the blank-molds into and out of the blow-molds after such withdrawal.

2. In a glass blowing machine, the combination of a rotatable carrier, a series of blow-molds mounted thereon, a second rotating carrier, a series of blank or press-molds mounted therein, a gear wheel on said press-mold carrier, a gear wheel driven with the blow-mold carrier and meshing therewith whereby the blank molds will be brought into registry beneath the blow-molds, sliding bottoms for said blow molds, means brought into action automatically by the movement of the carrier for withdrawing the same, a cylinder, and a fluid operated piston in said cylinder arranged to move the blank molds into and out of the blow-molds after such withdrawal.

3. In a glass blowing machine, the combination of a rotatable blow-mold carrier having a hub, a central stem or journal upon which said hub rotates, a crank arm journaled on said hub, said carrier having a series of apertures, a pin carried by said crank arm and adapted to enter one of said apertures, means for moving said crank arm in the arc of a circle, and fluid-controlled means for automatically retarding the movement of said crank arm.

4. In a glass blowing machine, the combination of a rotatable blow-mold carrier having a hub, a central stem or journal upon which said hub rotates, a crank arm journaled on said hub, said carrier having a series of apertures, a pin carried by said crank arm and adapted to enter one of said apertures, a spring for raising said pin, a piston rod, means for moving the same, a connection between it and said crank arm for moving the latter in the arc of a circle, and means for automatically retarding the movement of said piston rod.

5. In a glass blowing machine, the combination of a rotating blow-mold carrier having a hub journaled on a central stem, a crank arm journaled on said hub, a pin carried by said crank arm in operative engagement with the carrier at certain times, a reciprocating piston rod, means for moving the same, and a connection between said arm and rod whereby the carrier may be moved by the engagement of the pin when the piston rod is moving in one direction, and means for automatically retarding the movement of said piston rod.

6. In a glass blowing machine, the combination of a rotating blow-mold carrier having a hub journaled on a central stem, a crank arm journaled on said hub, said crank arm being at certain times in operative engagement with the carrier, a reciprocating piston-rod, a connection between said arm and rod whereby the carrier may be moved when the piston is moving in one direction, and means for automatically retarding the movement of said piston-rod.

7. In a glass blowing machine, the combination of a rotatable blow-mold carrier, a hub carried thereby, a central stem on which said hub is journaled, said carrier having two sets of recesses or apertures, a crank arm journaled on the hub, a pin carried thereby and adapted to engage one of one set of apertures to move the carrier, means for moving said crank arm, a fluid operated locking pin adapted to engage one of the other set of apertures when the carrier reaches its limit of movement, a valve controlling the movement of the locking pin, and means actuated by the mechanism for moving the crank arm for operating said valve.

8. In a glass-blowing machine, the combination of a rotatable blow-mold carrier, a hub carried thereby, a central stem on which said hub is journaled, said carrier having two sets of recesses or apertures, a crank arm journaled on the hub, a pin carried thereby and adapted to engage one of one set of apertures to move the carrier, means for moving said crank arm, a fluid operated locking pin adapted to engage one of the other set of apertures when the carrier reaches its limit of movement, a valve controlling the movement of the locking pin, means actuated by the mechanism for moving the crank arm for operating said valve, and automatically operated means to release said locking pin.

9. In a glass blowing machine, the combination of a rotatable blow-mold carrier, means for imparting an intermittent rotative movement to the same including a piston rod, said carrier having a series of apertures, a locking pin adapted to enter one of said apertures when the carrier reaches the limit of its intermittent movement, means for raising said pin, an operating lever in engagement with said pin, fluid operated means for moving said lever to withdraw the pin when it is desired to move the carrier again, and a valve controlling said fluid operated means.

10. In a glass blowing machine, the combination of a rotatable blow-mold carrier, means for imparting intermittent rotative movement to the same including a piston rod, said carrier having a series of apertures, a locking pin adapted to enter one of said apertures when the carrier reaches the limit of its intermittent movement, a spring for raising said pin, an operating lever in engagement with said pin, a piston arranged to move said lever and withdraw the locking pin, a valve controlling said piston, and a second lever for operating said valve actuated by the piston rod as it nears the limit of its retractive movement.

11. In a glass blowing machine, the combination of a rotatable blow-mold carrier, means for moving the same, means for retracting said moving means a locking pin for stopping said carrier at the end of its intermittent movements, a lever in engagement with said locking pin, a piston arranged to engage said lever to withdraw the locking pin, a valve controlling the passage of pressure to said piston, and means operated by the retractive movement of the mechanism operating the blow-mold carrier for opening said valve.

12. In a glass-blowing machine, the combination of a rotatable blow-mold carrier, means for moving the same, means for retracting said moving means a series of blow-molds carried thereby, a blow-pipe and blow-head for engagement with said molds to blow the glass within the same, a valve controlling the lowering of said blow-head, and means for actuating said valve by the retractive movement of the mechanism for rotating the blow-mold carrier.

13. In a glass blowing machine, the combination of a movable mold carrier, fluid pressure means for imparting a step-by-step movement to said carrier, a device for locking the carrier when at its moments of rest, and a fluid pressure retarding device combined with its operating means for opposing a gradually increasing resistance to the movement of the carrier as it approaches the end of its step-by-step movements.

14. In a glass blowing machine, the combination of a movable mold carrier, fluid-pressure means for feeding the same intermittently, a device for locking said carrier when at rest, a stationary cylinder, a piston movable within said cylinder, and connected with the carrier to oppose a gradually increasing resistance to the movement of the carrier as it approaches the end of its feed movement, and means for supplying said cylinder with fluid under pressure.

15. In a glass blowing machine, the combination of a rotatable mold carrier, means operated by fluid under pressure for moving said carrier, means controlling the passage of such fluid under pressure, and fluid controlled means directly combined therewith for effecting a gradually increasing resistance to the movement of the carrier as it approaches the end of such movement.

16. In a glass blowing machine, the combination of a rotatable mold carrier, means operated by fluid under pressure for moving said carrier intermittently, a valve for controlling the passage of such fluid pressure, and fluid controlled means combined with such valve for effecting a gradually increasing resistance to the motion of the carrier as it approaches the end of one of its intermittent movements.

17. In a glass blowing machine, the combination of a rotatable mold carrier, means for feeding the same intermittently including a stationary cylinder, and a piston movable within said cylinder and connected with the carrier, and means for opposing a gradually increasing resistance to the movement of the carrier as it approaches the end of such movement, comprising a second piston in line with the first mentioned piston and movable in and out of a cylinder in line with the first cylinder.

In testimony whereof, I have signed my name to this specification, in the presence of two subscribing witnesses.

WILLIAM DAYTON FREDRICK.

Witnesses:
 MARTHA H. DAVIS,
 CHARLES C. DAVIS.